(No Model.)
H. A. KLEMM.
BICYCLE BRAKE.
No. 605,047. Patented May 31, 1898.
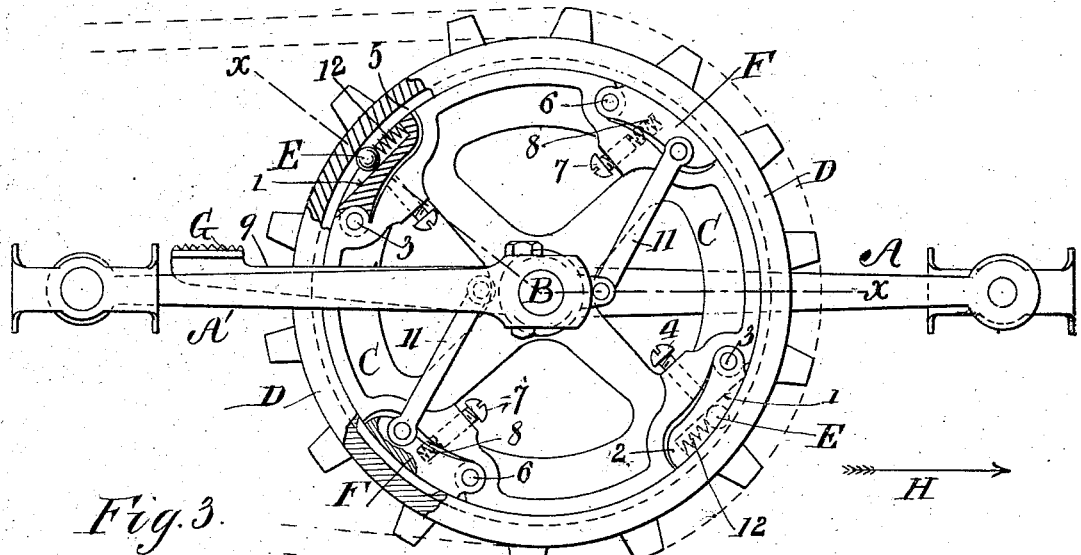
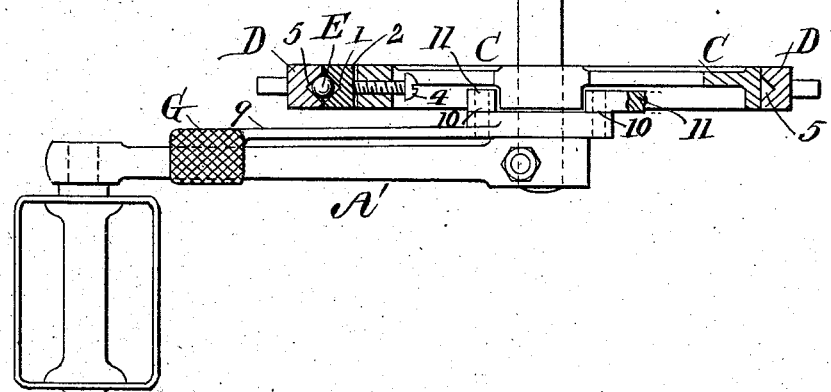
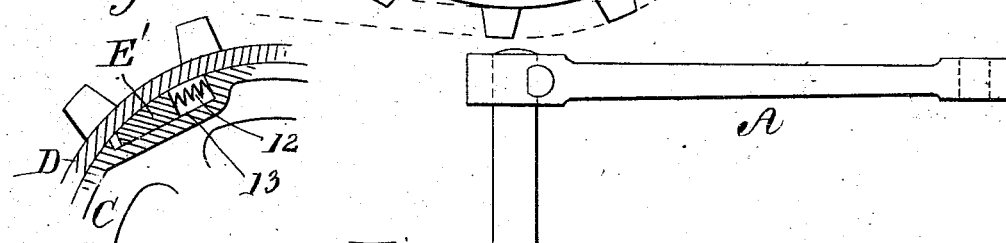
WITNESSES:
INVENTOR.
Hermann Arthur Klemm,
BY
ATTORNEY.

UNITED STATES PATENT OFFICE.

HERMANN ARTHUR KLEMM, OF NEW YORK, N. Y., ASSIGNOR OF THREE-FOURTHS TO JOHN METTAUER, OF SAME PLACE, AND F. E. GLATZ, OF BROOKLYN, NEW YORK.

BICYCLE-BRAKE.

SPECIFICATION forming part of Letters Patent No. 605,047, dated May 31, 1898.

Application filed June 24, 1896. Serial No. 596,720. (No model.)

*To all whom it may concern:*

Be it known that I, HERMANN ARTHUR KLEMM, a citizen of the United States, and a resident of New York, in the county of New York and State of New York, have invented certain new and useful Improvements in Bicycle-Brakes, of which the following is a specification.

My invention relates to brake mechanism combined with propelling mechanism in cycles, and the same is applicable to chain or other propulsion in which a driving sprocket-wheel comprising a toothed ring is fitted to the periphery of a wheel keyed to the crank-shaft so as to turn thereon, with intermediate clutches that positively drive the toothed ring forward, but permit it to run when the wheel is retarded or stopped altogether by back pressure on the pedals and then act as friction-brakes; and it consists of the said clutches being shoes in recesses in the face of the wheel and adapted to grip the ring and having springs to press them on the inner periphery of the ring for causing the friction. The ring is retained in its position on the wheel by balls located in the face of the wheel and a groove in the inner face of the ring, wherein the balls work.

The invention also comprises a foot-lever device for increasing the friction of the brake mechanism in cases of emergency, said foot-lever located in suitable relation to one of the cranks and pedals, whereby it can be actuated by the foot while on the pedal.

Referring to the accompanying drawings, Figure 1 is a side view showing the invention applied to the sprocket-wheel and cranks of a bicycle. Fig. 2 is a plan view of Fig. 1, partly in section, on line *x x;* and Fig. 3 is a sectional view of a modification.

The cranks A A' are fixed to the crank-shaft B in the usual manner, and the hub or central part of the sprocket-wheel C is also fixed to the crank-shaft B, and the outer part or chain-carrying rim of the sprocket-wheel at D turns independently on the inner part C. Clutch-balls E E, having inclined seats 1 in the shoes 2, are the means herein illustrated for effecting positive engagement of the inner part C with the outer part D when the pedals are propelled forward. Said shoes are pivoted at 3 and may be set to bear with the desired degree of friction by set-screws 4. The balls E engage in the circumferential groove 5 in the rim D and serve to retain the same in place.

F F are brake-shoes, and the same are pivoted at 6 to the part C or may be otherwise supported movably. These are pressed against the rim D with friction by means of set-screws 7, and springs 8 are interposed between said screws and the shoes F.

One of the cranks A' is fitted with means for regulating the amount of friction or binding force of the part C on the part D while the pedals are retarded, the same consisting in an auxiliary pedal G, which is mounted on an arm 9, suitably journaled, preferably on the shaft B, rotating freely thereon to a limited extent, and said arm 9 has pivoted to it at 10 10 toggle-arms 11 11, connected to the shoes F F, whereby when the pedal bearing said arm 9 is at a rear position it may be retarded and the toe of the foot may be turned a little, so as to press upon the auxiliary pedal G and force the brake-shoes F F hard against the rim D, effectually stopping the machine.

The arrow H, Fig. 1, indicates the forward motion of the cycle, and the crank A' occupies the position for applying brakes.

The number of shoes E and shoes F may be multiplied as desired in the construction of the device.

When it is desired to stop the machine with moderate brake action or to check the speed in descending grades, a retardation of the pedals without pressing the part G will suffice to effect said purpose by the pressure of the springs 8 on the brake-shoes F.

The modification shown in Fig. 3 consists in substituting clutch-wedges E' for the clutch-balls E, the same seating on inclined surfaces 3 and operating in the same manner.

Springs 12 are provided to keep the balls in the instance of Fig. 1 or the wedges in the instance of Fig. 3 toward the apex of the incline.

When an emergency stop is required, the forward foot may be thrust under the corresponding pedal, catching the same when the rear pedal has been arrested by the rear foot, and the rider may thereby positively prevent the pedals from turning after the brake-shoes are applied by the part G and also thereby add much more to the force than his weight on said part G by reason of positively holding up the front pedal by the front foot, the body being kept erect by the hold on the handle-bar.

Having thus fully described my invention, what I claim, and desire to secure by Letters Patent, is—

1. In a bicycle propelling and brake mechanism, the combination of pedal-cranks, a rotary driving part, and a rotary driven part, and a clutch having balls with inclined seats in one of said parts, and bearing on the other said part, adapted to positively engage by the forward propelling motion of the pedal, and spring-pressed shoes on the one said part in constant engagement with the other said part, and adapted to act as a brake when the pedals are retarded substantially as set forth.

2. In a bicycle propelling and braking mechanism, the combination of pedal-cranks, a rotary driving part, and a rotary driven part, clutch-balls having inclined seats upon the one said part and bearing upon the other said part, the inclined part of said seats being adjustably pivoted, spring-pressed brake-shoes in constant engagement between the driving and driven parts, and means for adjusting the tension of the springs, substantially as set forth and shown.

3. In a bicycle, the combination of pedal-cranks and a rotary shaft to which said cranks are fixed, of an auxiliary brake-pedal loosely mounted upon said shaft in movable relation to said cranks and rotative therewith and located adjacent to a crank-pedal in a position accessible to the foot of the rider without removing said foot from said crank-pedal, a rotary brake-shoe bearing part fixed to said crank-shaft and brake-shoes mounted thereon, an independently rotary driven part mounted on said bearing part, and operative connection between said brake-pedal and said brake-shoes, all arranged whereby the pedal-cranks may be arrested while the bicycle is in motion and the brake-shoes may then be pressed with friction upon said driven part by the application of the foot of the rider to said brake-pedal.

4. In a bicycle propelling mechanism, the combination of pedal-cranks, a rotary brake-shoe bearing part fixed to the crank-shaft carrying a driven part independently rotary, the brake-shoes, a toggle mechanism substantially as described, and an auxiliary pedal connected to said toggle and located on or near the pedal-crank accessible to the foot of the rider.

5. In a bicycle propelling and brake mechanism, the combination of pedal-cranks, a rotary driving part, a rotary driven part, clutch-balls having inclined seats in the one said part and bearing on the other said part, said seats consisting in pivoted shoes and adjusting-screws arranged to regulate the pressure of said shoes on the driven part, substantially as and for the purposes described.

Signed at New York, in the county of New York and State of New York, this 20th day of June, A. D. 1896.

HERMANN ARTHUR KLEMM.

Witnesses:
G. FAUVEL GOURAND,
D. JAMES PHELAN.